…

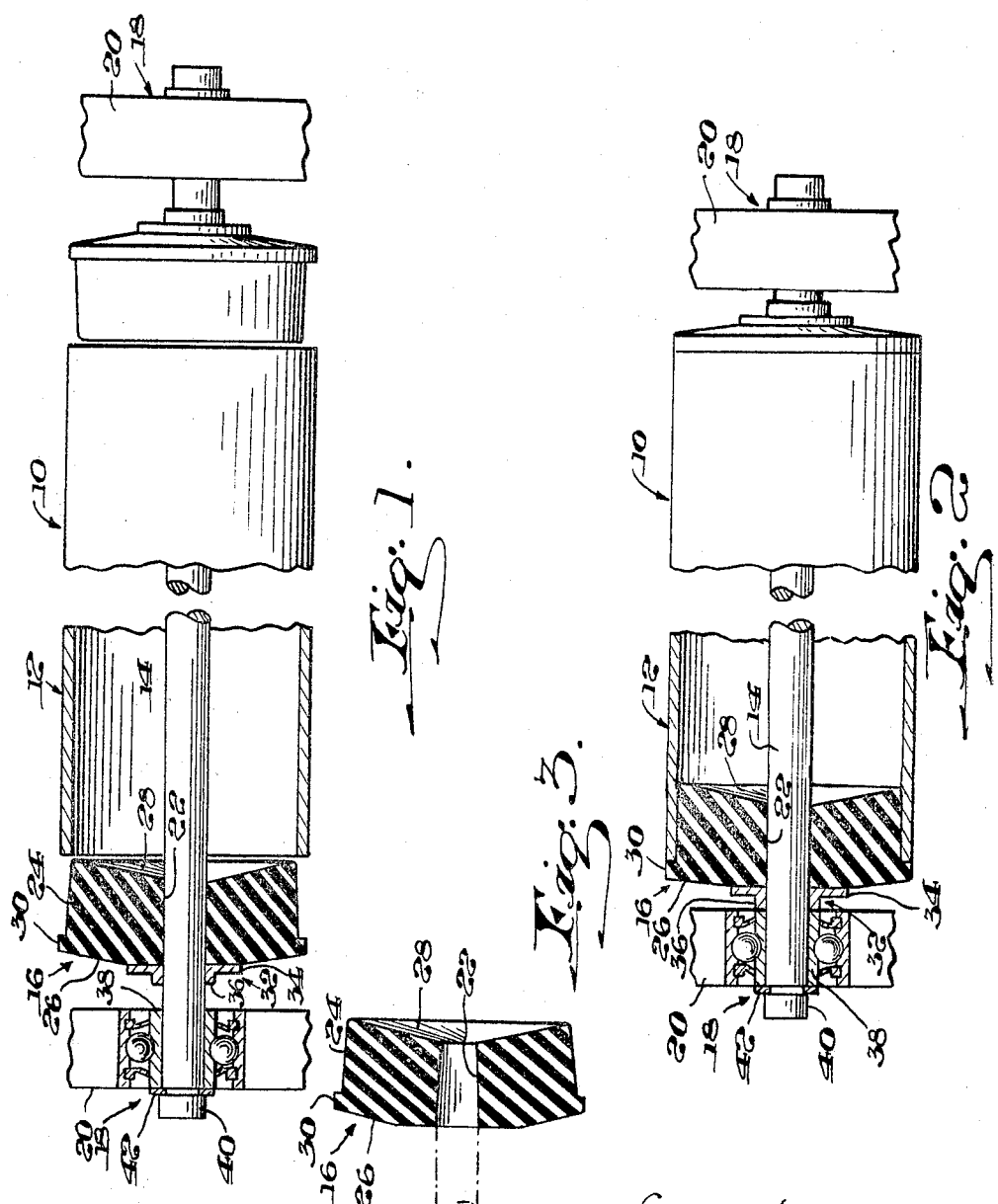

United States Patent Office 3,270,577
Patented Sept. 6, 1966

3,270,577
IDLER ROLLERS AND METHOD OF
MAKING THE SAME
William N. Poundstone, Morgantown, W. Va., assignor to Consolidation Coal Company, Pittsburgh, Pa., a corporation of Pennsylvania
Filed Dec. 7, 1964, Ser. No. 416,571
3 Claims. (Cl. 74—230.4)

This application is a continuation-in-part of my copending application Serial Number 187,117, filed April 12, 1962, now abandoned, and entitled, "Idler Rollers and Method of Making the Same." The above copending application is in turn a continuation-in-part of several other applications identified therein.

This invention relates generally to idler roller assemblies and their components, and more particularly to idler roller assemblies which are adapted to support an endless conveyor belt.

This invention is directed to improved idler roller assemblies of the type which are utilized to support the belt of a belt conveyor and particularly to idler roller assemblies which have the shaft nonrotatably secured to the tubular roller and are mounted to rotate as a unit relative to a fixed structure that supports the idler at the outboard ends of the fixed shaft. The idler rollers of the present invention are designed for ease of assembly, shock resistance and simplicity of manufacture.

In the idler roller assemblies of the present invention, the radial distance between the roller shaft and the tubular roller is occupied by an annular resilient member which is, upon assembly of the roller, distorted to maintain the outer tubular roller in fixed concentric relation with the shaft. The distorted resilient member between the shaft and the outer tubular roller permits ease of assembly of the roller and also provides shock resistance to the assembly.

As will be described in detail hereinafter, the rollers of the present invention that utilize the resilient supporting members to support the tubular roller differ from all other rollers previously designed and constructed in that the annular resilient members of the present invention are designed to be initially distorted upon assembly of the roller and to be maintained in a distorted condition while the roller remains assembled. This type of assembly serves to facilitate initial assembly of the roller and to facilitate disassembly of the roller for repair or inspection of the roller components.

The present invention provides an idler roller assembly in which the tubular roller may be formed from a length of standard pipe. The shaft is coaxially positioned within the tubular roller and a pair of annular resilient supporting members maintain the tubular roller on the shaft in coaxial relation thereto. With the present invention it is now possible to fabricate and assemble the idler rollers at the job site with standard tubular pipe and cylindrical shafts. The only specially fabricated elements required are the resilient annular supporting members.

The annular resilient supporting members that support the tubular roller are distorted by a compressive force applied axially so that the external surfaces of the supporting members are forced into frictional engagement with the cylindrical internal surface of the tubular roller. The distortion of the annular resilient supporting member also causes the internal surface of the supporting member to be forced into frictional engagement with the cylindrical outer surface of the shaft. In the preferred construction of the annular resilient supporting members, the supporting members have frusto conical end walls. Because of these frusto conical end walls, the degree of distortion desired is easily obtained by exerting a relatively small axial force on the annular resilient supporting member adjacent its internal surface. In fact, the resilient supporting members with the frusto conical end walls appear to exhibit the properties of a toggle joint in that a relatively small axial force at the center of the resilient supporting member exerts an end-wise force along the circumference of the supporting members to frictionally engage the supporting member external surface to the cylindrical internal surface of the tubular roller member.

With the foregoing considerations in mind, it is the principal object of this invention to provide an idler roller assembly that is quickly and easily assembled.

Another object of the present invention is to provide an idler roller assembly which includes annular resilient support means that concentrically maintain the tubular roller on the shaft.

Another object of this invention is to provide a method of quickly and inexpensively assembling an idler roller with components that may be easily replaced.

Another object of this invention is to provide an idler roller which may be easily disassembled to replace the damaged components.

These and other objects of the present invention will become apparent as this description proceeds in conjunction with the accompanying drawings.

In the drawings:

FIGURE 1 is a longitudinal view, partly in section, illustrating the idler roller in a disassembled state and the annular resilient supporting member in a partially distorted state.

FIGURE 2 is a longitudinal section similar to FIGURE 1 illustrating the assembled idler roller and the annular resilient supporting member in a distorted state.

FIGURE 3 is a sectional view of an annular resilient supporting member shown in its undistorted state.

In the drawings the idler roller assembly generally designated by the numeral 10 includes a tubular roller 12 with a shaft 14 extending coaxially therethrough. A pair of annular resilient supporting members 16 concentrically support the tubular roller 12 on the shaft 14 so that the shaft 14 rotates with the tubular roller 12. The shaft 14 is supported adjacent its end portions in bearing assemblies 18 that are secured to portions of the conveyor structure designated by the numeral 20. In conventional conveyor installations the distances between the portions of the conveyor structure to which the bearings 18 are secured are usually arranged in fixed spaced relation to each other. To illustrate, however, how the idler roller assembly 10 appears in a partially assembled and a completely assembled condition, the portions of the conveyor structure which support the bearings 18 are shown in different spaced relations to each other. It is readily apparent that the idler roller assembly herein described may be used with conveyor structures wherein the bearing support portions are at a fixed spaced relation to each other or are movable relative to each other. The bearing assemblies 18 may be of the conventional pillow block type with means provided in the pillow block assemblies to lubricate the bearings.

The annular resilient supporting member 16 is formed of a rubber or like resilient material and has, in its relaxed or undistorted condition as shown in FIGURE 3, a frusto conical internal surface 22, a frusto conical external surface 24, a frusto conical convex outer end wall 26 and a frusto conical concave inner end wall 28. A flange 30, formed on the external surface 24 adjacent the convex outer end wall, 26, extends radially outwardly beyond the maximum diameter of frusto conical external surface 24. The annular resilient supporting member 16 is so formed that the frusto conical internal surface 22 has a maximum diameter approximately equal to the diameter of the shaft 14 and a frusto conical external surface 24 that has a minimum diameter approximately equal to the internal diameter of the tubular roller 12 within which the annular resilient supporting member is to be placed.

The pair of annular resilient supporting members are positioned on the shaft 14 as is illustrated in FIGURE 1. Because of the relative dimension of the internal bore of the annular resilient members 16 and the diameter of shaft 14, the annular resilient members 16 are partially distorted.

A pair of annular sleeve members 32 are positioned on the shafts 14 with the radially extending end flange 34 abutting the respective annular supporting member convex outer end walls 26. The sleeve members 32 have other end portions 36 that have a dimension substantially the same as the dimension of the bearing assembly inner race 38.

The shaft 14 has a pair of snap ring grooves 40 arranged in spaced relation to each other and adjacent the shaft end portions. The snap ring grooves 40 are arranged to receive snap rings 42 that maintain the idler roller assembly 10 in assembled condition with the annular resilient supporting members distorted to frictionally engage the tubular roller 12 and the shaft 14, as later described. To assemble the idler roller 10 the tubular roller 12 is positioned coaxially over the shaft 14. The annular resilient supporting members 16 are then inserted within the end portions of the tubular roller 12 and over the shaft 14. The rigid annular sleeve members 32 are then positioned over the ends of the shaft 14 and are moved toward each other until the radial flanges 34 abut the respective annular resilient supporting members 16. Bearing assemblies 18 are then positioned on the shaft 14 and moved inwardly until the inner race 38 abuts the sleeve member end portion 36. An axial force is then exerted on each bearing inner race 38 to force the central portion of the annular resilient supporting members 16 inwardly by the axial force transmitted through the sleeve members 32. The axial force is increased until the resilient supporting members 16 distort to the position illustrated in FIGURE 2 wherein the bearing inner races 38 are each positioned axially inboard the snap ring grooves 40 formed on the ends of shaft 14. Snap rings 42 are then postioned within the grooves 40 to maintain the annular support members 16 in their distorted position. The bearings 18 are then suitably secured to the conveyor structure 20 in a suitable manner.

The distortion of the annular resilient supporting members 16 causes the frusto conical outer wall 24 to forcefully engage the internal surface of the tubular roller 12 and causes the frusto conical inner wall 22 to forcefully engage the cylindrical external surface of shaft 14.

To disassemble the idler roller 10, the bearing assemblies 18 are removed from the conveyor structure 20, the snap rings 42 are removed to relieve the distortion on the annular resilient supporting members 16 and the resilient supporting members 16 may thereafter be removed from the shaft 14 and the tubular roller 12.

According to the provisions of the patent statutes, the principle, preferred construction, and mode of operation of the invention have been explained and what is considered to represent its best embodiment has been illustrated. However, it should be understood that, within the scope of the appended claims, the invention may be practiced otherwise than as specifically illustrated and described.

What is claimed is:
1. An idler roller assembly comprising,
a shaft supported for rotation by bearing means located on the end of said shaft,
a tubular roller having a cylindrical external surface and first and second end portions having cylindrical internal surfaces,
a pair of annular resilient support members coaxially positioned within said tubular roller end portions and constructed and arranged to fix said tubular roller to said shaft in coaxial and nonrotatable relation therewith,
said annular support members each having in its undistorted condition a substantially frusto conical concave first end wall and a substantially frusto conical convex second end wall,
said annular support members positioned on said shaft and within said tubular roller end portions with said support member concave end walls facing each other,
stop means to limit inward axial movement of said annular resilient support members relative to said tubular roller end portions, and
retaining means secured to said shaft to retain said annular support members from moving axially outwardly on said shaft after said annular resilient support members have been distorted by axial forces applied to move said annular resilient support members axially inwardly on said shaft,
said annular resilient support members each being in axial shear between said tubular roller and said shaft.
2. An idler roller assembly comprising,
a tubular roller having a cylindrical external surface and first and second end portions having cylindrical internal surfaces,
a rotatable shaft extending coaxially through said roller,
a pair of annular resilient support members coaxially positioned within said tubular roller end portions and constructed and arranged to fix said tubular roller to said rotatable shaft in coaxial and nonrotatable relation therewith,
said annular support members each having in its undistorted condition a substantially frusto conical external surface, a frusto conical internal surface, a substantially frusto conical concave first end wall and a substantially frusto conical convex second end wall,
said annular support members positioned within said tubular roller end portions with said support member concave first end walls facing each other and said support member frusto conical surfaces being distorted by said tubular roller end portion cylindrical internal surfaces, said annular support members being positioned on said rotatable shaft with said annular resilient support member frusto conical internal surfaces being distorted by said shaft,
securing means to axially retain said annular support members on said shaft, said securing means retaining said annular support members in a position assumed by said annular support members after said annular support members have been distorted by exerting an axial force on each of them to urge them toward each other,
said securing means exerting a deforming force on said annular support member convex second end walls adjacent said frusto conical internal surfaces to thereby distort said annular support members to maintain said annular support member external surfaces in tight frictional engagement with said tubular roller end portion cylindrical internal surfaces and to maintain said annular support member internal surfaces in tight frictional engagement with said shaft.
3. An idler roller assembly comprising,
a tubular roller having a cylindrical external surface, first and second end portions having cylindrical internal surfaces,
a rotatable shaft extending coaxially through said roller,
a pair of annular resilient support members coaxially positioned within said tubular roller and constructed and arranged to fix said tubular roller to said rotat- able shaft in coaxial and nonrotatable relation therewith, said annular support members each having in its undistorted condition a substantially frusto conical external surface, a frusto conical internal surface, a substantially frusto conical concave first end wall, and a substantially frusto conical convex second end wall, said convex second end wall extending radially beyond said annular support member frusto conical external surface to form a radially extending shoulder on said support member frusto conical external surface adjacent said convex second end wall, said annular support members positioned within said tubular roller end portions with said annular support member concave first end walls facing each other, with said annular support member radially extending shoulders abutting said respective tubular roller end portions, and with said annular support member frusto conical outer surfaces being distorted by said tubular roller end portion cylindrical internal surfaces, said annular support members being positioned on said rotatable shaft with said annular resilient support member frusto conical internal surfaces being distorted by said shaft, securing means to axially retain said annular support members on said shaft, said securing means retaining said annular resilient support members in a position assumed by said annular resilient support members after said support members have been distorted by urging said support members axially toward each other, and said securing means exerting a deforming force on said annular support member convex second end walls adjacent said annular support member internal surfaces to thereby distort said annular support members to maintain said annular support member external surfaces in tight frictional engagement with said tubular roller end portion cylindrical internal surfaces and to maintain said annular support member internal surfaces in tight frictional engagement with said shaft.

References Cited by the Examiner
UNITED STATES PATENTS

| | | | |
|---|---|---|---|
| 383,815 | 5/1888 | Kilborn | 285—139 X |
| 1,891,405 | 12/1932 | Ericksson | 287—52.07 X |
| 2,120,875 | 6/1938 | Tatnall. | |
| 2,169,625 | 8/1939 | Weiss et al. | |
| 2,285,340 | 6/1942 | Lockwood. | |
| 2,353,510 | 7/1944 | Searles et al. | 74—230.01 |
| 2,390,282 | 12/1945 | Tour et al. | |
| 2,510,358 | 6/1950 | Wolf | 285—138 X |
| 2,546,309 | 3/1951 | Kempf | 287—114 X |
| 2,753,886 | 7/1956 | Powers | 64—11 X |
| 2,800,704 | 7/1957 | Mohn | 29—123 |
| 3,064,452 | 11/1962 | Gast | 287—126 X |
| 3,098,027 | 7/1963 | Flower | 287—114 X |

DAVID J. WILLIAMOWSKY, *Primary Examiner.*

DON A. WAITE, *Examiner.*

J. A. WONG, *Assistant Examiner.*